Patented May 26, 1931

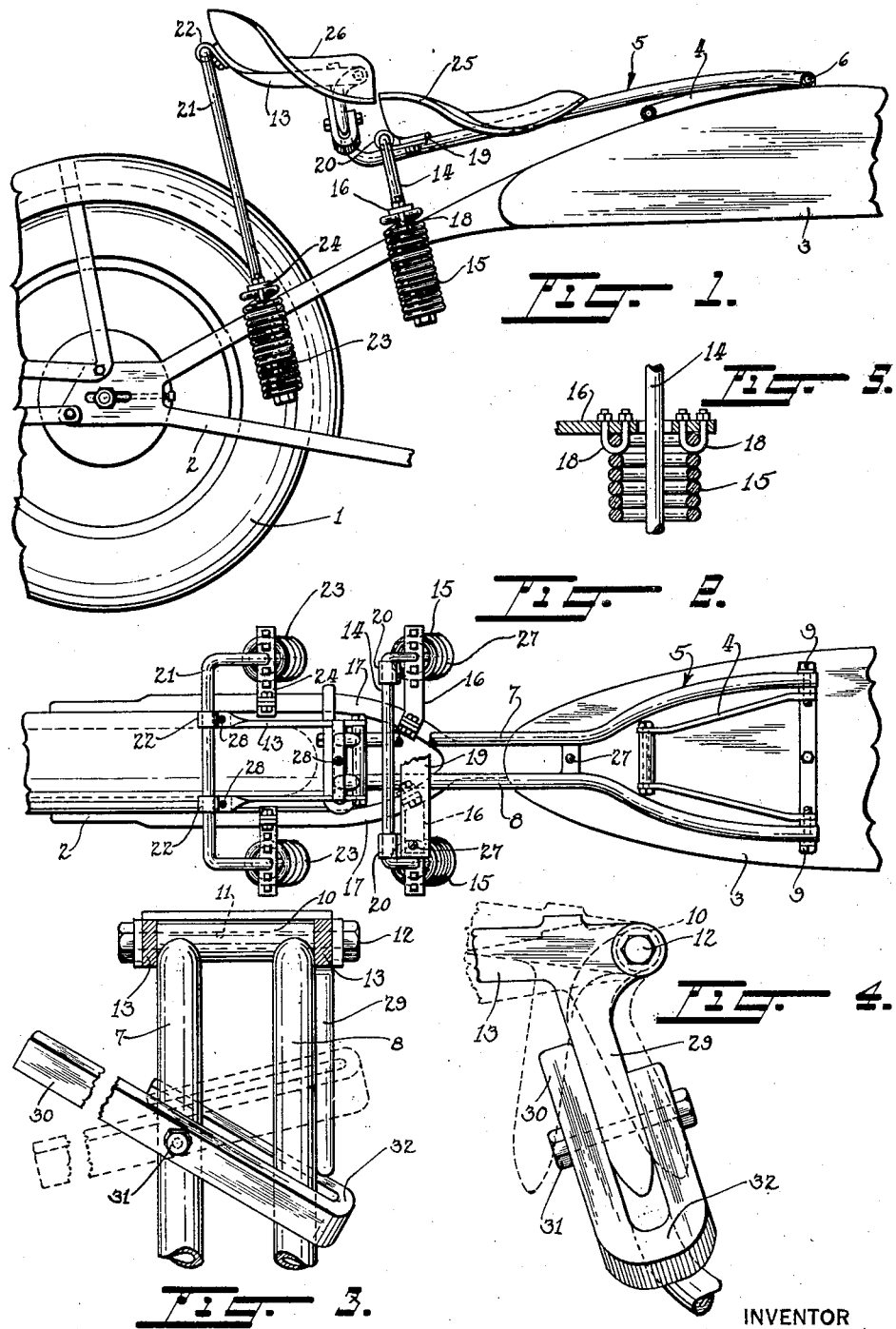

1,807,077

UNITED STATES PATENT OFFICE

CARL ALFRED VAN PAPPELENDAM, OF KEOKUK, IOWA

TANDEM SEAT CONSTRUCTION

Application filed September 20, 1929. Serial No. 393,992.

My invention relates to improvements in tandem seat constructions, and it consists in the combinations, constructions, and arrangements herein described and claimed.

An object of my invention is to provide a tandem seat construction of the type whereby the occupants of the seats will be positioned in relatively close relation, thereby permitting the vehicle, such as a motorcycle, to be easily controlled and providing easy riding qualities.

A further object is to provide a tandem seat construction for motorcycles arranged in such a way that the rear seat is positioned near the center of the motorcycle, thereby minimizing in a large measure the shaking incidental to riding the usual tandem seat constructions.

A further object is to provide a tandem seat construction for motorcycles in which means is provided for locking the rear seat with respect to the front seat for permitting unity of operation as when two people are riding a motorcycle, and in which means is provided for disconnecting the rigid connection between the two seats for permitting relative movement of one seat with respect to the other as when the front seat alone is occupied.

Other objects and advantages will appear in the following specification, and the novel features of the invention will be particularly pointed out in the appended claims.

My invention is illustrated in the accompanying drawings, forming part of this application, in which—

Figure 1 is a side elevation of a portion of a motorcycle embodying my invention, Figure 2 is a top plan view of the structure shown in Figure 1, Figure 3 is an enlarged detail of a portion of my invention, Figure 4 is a side view of the structure shown in Figure 3, and Figure 5 is a sectional detail view showing the manner in which the spring mountings are attached to the vehicle.

In carrying out my invention, I make use of a motorcycle of any standard construction. In Figure 1 I have shown a fragmentary view of a motorcycle. The motorcycle is provided with a rear wheel 1 for supporting a frame 2 which carries a gas tank 3. In Figures 1 and 2 I have shown a bracket 4 as being disposed upon the tank 3. A front seat supporting frame 5 is pivotally mounted at 6 with respect to the bracket 4. The supporting frame comprises members 7 and 8. The members 7 and 8 are pivotally mounted at 9 on the bracket 4. The rear ends of the members 7 and 8 are connected together by means of a cross member 10 which is preferably provided with an opening 11 for receiving a bolt 12 which operatively connects a rear seat supporting element 13. The forward end of the rear supporting element is hingedly connected with respect to the rear end of the front seat supporting structure 5. The rear seat may be rigidly connected with the front seat, as will be more fully explained later.

The rear end of the front seat supporting frame 5 is provided with a U-shaped rod construction 14, the lower ends of which are operatively connected with springs 15. One end of each of the springs 15 is connected with one end of the U-shaped member 14. The opposite ends of the springs are connected with brackets 16 which are rigidly mounted upon the frame portions 17 of the frame proper.

In Figure 5 I have shown the manner in which the springs 15 are connected with the brackets 16. The upper ends of the springs are rigidly secured to the brackets by means of suitable U bolts 18. The extreme ends of the U construction 14 are operatively connected with the lower ends of the springs 15 in such a manner that a downward movement of the seat supporting frame 5 will cause an elongation of the springs. The means for connecting the U-shaped construction 14 with the frame 5 comprises a bar 19 which is provided with loops 20 through which the member 14 projects. The bar is rigidly secured to the frame 5 by any suitable means, such as welding or bolting.

The rear seat supporting structure 13 is operatively connected with a rear U-shaped member 21. The support 13 is looped as at 22 for permitting connection with the member 21. The lower ends of the latter are operatively connected with the lower ends of springs 23. The upper ends of the springs are rigidly connected with brackets 24 which are firmly mounted upon the frame portions 17 of the main assembly. In Figure 1 I have shown a front seat 25 and a rear seat 26 as being mounted in their respective positions. The seats are provided with the usual metal supporting covering underneath. The front seat may be rigidly secured in position by means of suitable rivets or bolts 27, see Figure 2. The rear seat may be secured upon the rear seat supporting bracket 13 by means of similar rivets or bolts 28.

The rear seat support 13 is provided with an arm 29. The latter is rigidly connected with respect to the support 13. A locking lever 30 is pivotally mounted at 31 upon the member 7. The lever is looped as at 32, whereby when the lever is moved from the full line position to the dotted line position shown in Figure 3, the arm 9 will be disposed within the loop for rigidly connecting the rear seat support 13 with the front seat support 5.

When, however, the lever 30 is in the full line position shown in Figures 3 and 4, the rear seat will be flexibly connected with the front seat; that is to say, when an occupant is seated upon the front seat, the latter operates independently of the rear seat. Any movement of the front seat will cause a pivotal action of the rear seat about the rear end connection of the support 13. When, however, both the front and the rear seats are occupied, the lever 30 is moved to the dotted line position shown in Figure 3, at which time the front and rear seats will be rigidly connected.

In referring to Figure 2, it will be noted that the forward ends of the members 7 and 8 are spread apart, whereby the seat supports are rigidly supported against lateral movement. It will be noted that the front and rear seats are grouped relatively close together and between the front and rear wheels. This construction provides a seat arrangement which eliminates in a large measure the shaking incidental to the usual tandem seat constructions. Further than this, I have provided an arrangement whereby a considerable amount of space is attained above the rear wheel for permitting baggage and the like to be carried. In addition to providing an easy riding seat construction, I have also grouped the seats so that the motorcycle is easy to control. Each seat is provided with individual spring suspensions which may be rigidly locked together and which, when it is desired, may be provided with a flexible connection for permitting a single occupant to ride with ease.

I claim:

1. In a vehicle having a frame supported on front and rear wheels, the combination of means for mounting a plurality of seats upon said frame, a hinge connection between the seats, and means cooperating with said hinge connection for rigidly connecting the seats.

2. In a vehicle having a frame supported on front and rear wheels, the combination of a pair of seats yieldingly mounted upon the frame, a hinge connection between said seats, and means for making the hinge connection rigid whereby the seats may be connected as a unit.

3. In a vehicle having a frame supported on wheels, a plurality of seats mounted in tandem relation upon the frame, a hinge connection between the seats, and means for making said hinge connection rigid, whereby the seats will function as a unit.

4. In a vehicle having a frame supported on wheels, a plurality of seats arranged in tandem relation, spring means supported by the frame and operatively connected with each of the seats, a hinge connection between the seats, and means for making the hinge connection rigid.

5. In a vehicle having a frame supported on front and rear wheels, a plurality of seats arranged in tandem relation and positioned between the front and rear wheels, spring means carried by the frame and operatively connected with said seats, a hinge connection between the seats, and means for making said hinge connection rigid.

6. A vehicle having a frame, a plurality of seats normally carried by the vehicle and mounted upon the frame, said seats being normally movable independently of each other, and means operatively connecting the two whereby the seats will function as a unit.

Signed at Keokuk, in the county of Lee and State of Iowa, this 16th day of September, A. D. nineteen hundred and twenty-nine.

CARL ALFRED van PAPPELENDAM.